(12) United States Patent
Wang

(10) Patent No.: US 6,393,957 B1
(45) Date of Patent: May 28, 2002

(54) SCROLL SAW ACTUATING MECHANISM

(76) Inventor: Tian Wang Wang, No. 45, Yi Chang East Road, Taiping City, Taichung Hsien (TW), 411

( * ) Notice: Subject to any disclaimer, the term of this patent is extended or adjusted under 35 U.S.C. 154(b) by 0 days.

(21) Appl. No.: 09/635,794

(22) Filed: Aug. 11, 2000

(51) Int. Cl.[7] ................................................. B26D 5/16
(52) U.S. Cl. ............................ 83/602; 83/604; 83/779; 83/777
(58) Field of Search .................... 83/779, 777, 783, 83/602, 604, 628, 630, 632, 662, 699.21

(56) References Cited

U.S. PATENT DOCUMENTS

| | | | |
|---|---|---|---|
| 267,449 A | * 11/1882 | Nixon ........................... | 83/779 |
| 1,856,740 A | * 5/1932 | Anderson ..................... | 83/777 |
| 2,255,457 A | * 9/1941 | Swain et al. .................. | 83/777 |
| 2,337,629 A | * 12/1943 | Shortell ........................ | 83/777 |
| 3,213,909 A | * 10/1965 | Kivimaa ....................... | 83/777 |
| 4,455,909 A | * 6/1984 | Wilbs ........................... | 83/777 |
| 5,065,652 A | * 11/1991 | Legler et al. .................. | 83/783 |
| 5,088,370 A | * 2/1992 | Kondo .......................... | 83/602 |
| 5,303,627 A | * 4/1994 | Shondel ....................... | 83/777 |
| 5,694,825 A | * 12/1997 | Chang .......................... | 83/662 |
| 5,768,971 A | 6/1998 | O'Banion et al. ............. | 83/784 |
| 5,937,724 A | * 8/1999 | O'Banion et al. ............. | 83/784 |
| 6,044,743 A | * 4/2000 | O'Banion et al. ............. | 83/784 |

* cited by examiner

Primary Examiner—M. Rachuba
Assistant Examiner—Kim Ngoc Tran
(74) Attorney, Agent, or Firm—Charles E. Haxley

(57) ABSTRACT

A scroll saw includes a rocker member and two rocker levers pivotally secured in a housing. The rocker levers each has a lateral leg and an extension. A saw blade is pivotally secured between the legs. Two links are pivotally secured between the rocker member and the extensions for forcing the rocker levers to move the saw blade up and down in the reciprocation action. A motor has a spindle coupled to the link via a cam and a bar and a beam for actuating the saw blade. The bar may be adjusted relative to the beam for adjusting the moving stroke of the saw blade.

2 Claims, 5 Drawing Sheets

SCROLL SAW ACTUATING MECHANISM

BACKGROUND OF THE INVENTION

1. Field of the Invention

The present invention relates to a scroll saw, and more particularly to a scroll saw having an improved actuating mechanism.

2. Description of the Prior Art

U.S. Pat. No. 5,768,971 to O'Banion et al. discloses a typical scroll saw including an upper and a lower slidable linkages and a pair of rocker arms slidably received in an upper and a lower stationary arms respectively. The saw blade is secured between the rocker arms and may be oscillated for conducting the sawing operations. However, the saw blade may not be dexterously operated.

The present invention has arisen to mitigate and/or obviate the afore-described disadvantages of the conventional scroll saws.

SUMMARY OF THE INVENTION

The primary objective of the present invention is to provide a scroll saw including an actuating mechanism for effectively and for dexterously actuating and operating the saw blade to conduct the sawing operations.

In accordance with one aspect of the invention, there is provided a scroll saw comprising a housing, a rocker member including a middle portion pivotally secured in the housing with a pivot shaft, and including two ends, a pair of rocker levers each pivotally secured in the housing with a pivot axle, the rocker levers each including a leg laterally extended outward therefrom and having a free end and each including an extension extended therefrom and having a free end, a saw blade including two ends pivotally secured between the free ends of the legs of the rocker levers, a pair of links pivotally secured between the ends of the rocker member and the free ends of the extensions of the rocker levers respectively for forcing the rocker levers to rotate about the pivot axles respectively when the rocker member is rotated about the pivot shaft; and oscillating or forcing means for oscillating the saw blade to move in a reciprocating action via the rocker members and the links.

The oscillating means includes a beam having a first end pivotally secured to a first link of the pair of links, a motor, and coupling means for coupling the motor to the beam and to oscillate the beam and the links.

The motor includes a spindle, the oscillating means includes a follower secured to the spindle and rotated in concert with the spindle, and a bar coupled between the follower and the beam for coupling the motor to the beam.

The beam includes at least one orifice formed therein, the oscillating means includes a pivot rod engaged through the orifice of the beam and engaged through the bar for pivotally and adjustably coupling the bar to the beam and for adjusting a moving stroke of the links and the saw blade.

The housing includes a base, a casing extended upward from the base, and a cantilever arm extended from the casing and provided above the base, the pair of links includes a first link slidably received in the base and a second link slidably received in the cantilever arm, and the rocker member is pivotally received in the casing.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
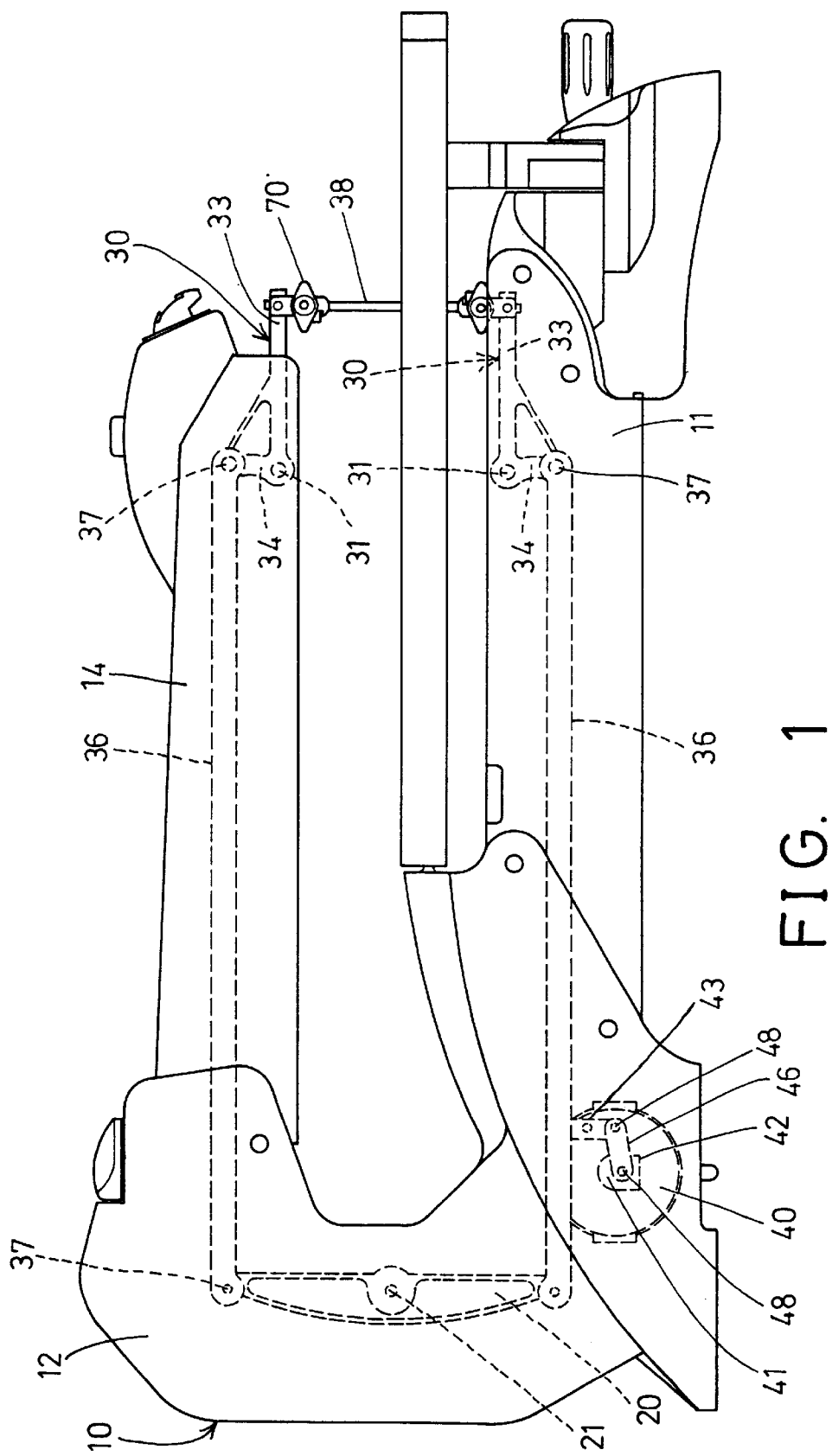
FIG. 1 is a plane view: of a scroll saw in accordance with the present invention.
Figure 2:
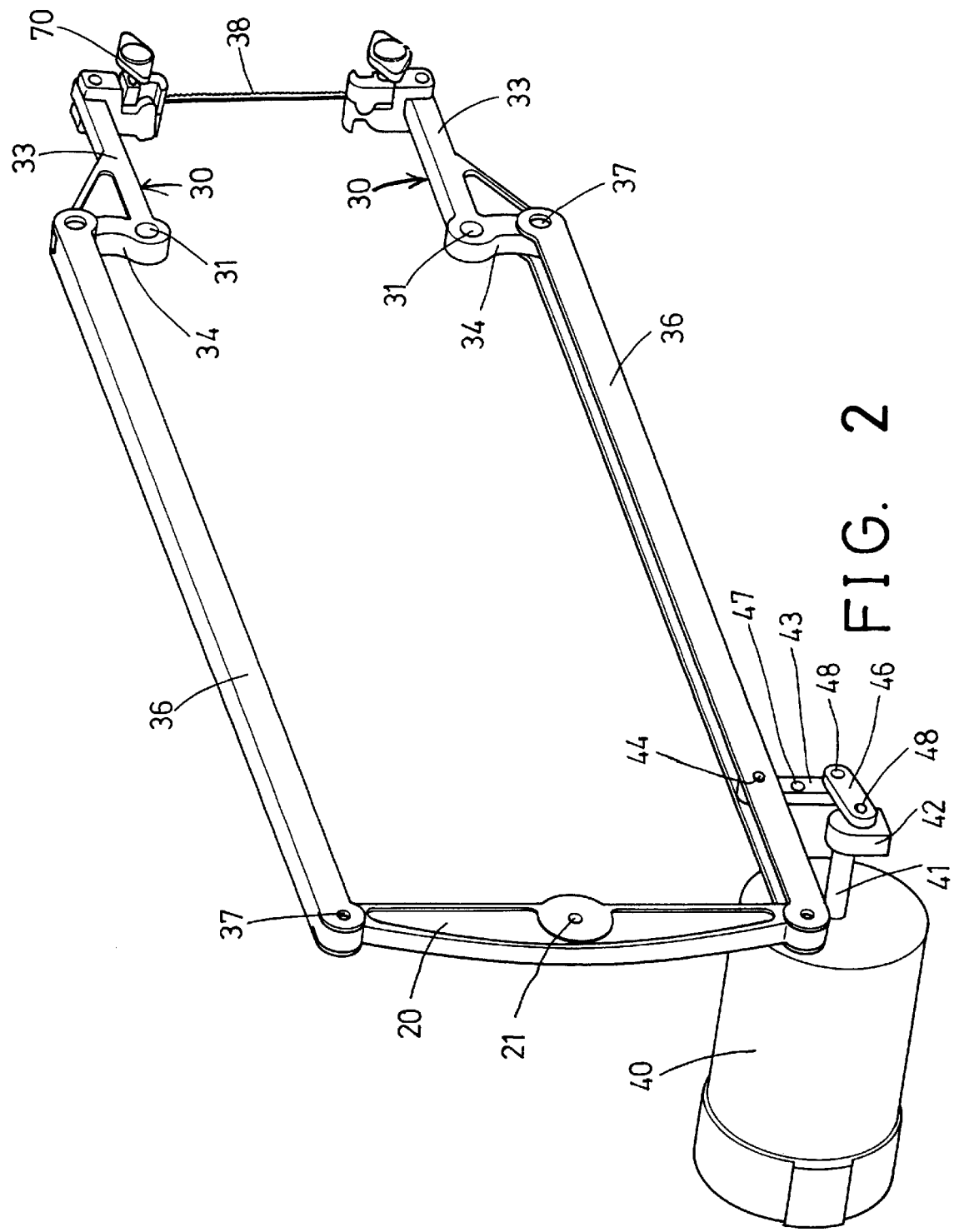
FIG. 2 is a perspective view of the actuating mechanism of the scroll saw.
Figure 3:
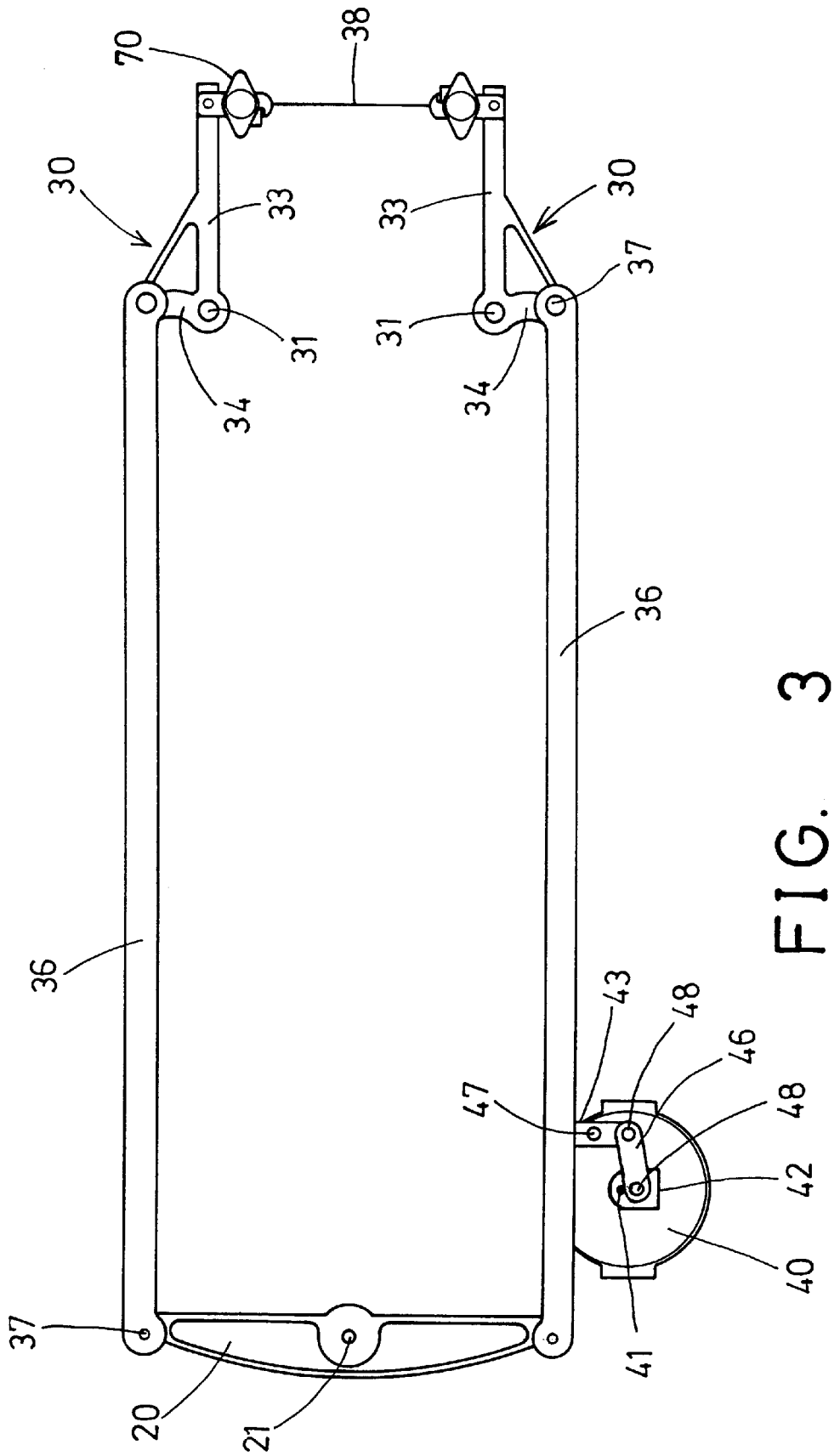
FIGS. 3, 4, 5 are plane views illustrating the operation of the actuating mechanism of the scroll saw.

Referring to the drawings, and initially to FIGS. 1–3, a scroll saw in accordance with the present invention comprises a housing 10 including a base 11, a casing 12 extended upward from one end of the base 11, and a stationary and cantilever arm 14 extended from the upper portion of the casing 12 and provided above the base 11 and preferably parallel to the base 11. A rocker member 20 includes a middle portion rotatably or pivotally secured in the casing 12 with a pivot shaft 21 and includes an upper end and a lower end.

A pair of rocker levers 30 each includes an L-shape having a middle portion rotatably or pivotally secured in the base 11 and in the stationary arm 14 with a pivot axle 31 respectively. The L-shaped rocker levers 30 each includes a leg 33 horizontally or laterally extended outward therefrom, and each includes an extension 34 vertically extended outward therefrom. A pair of links 36 are rotatably or pivotally coupled, with pivot pins 37, between the ends of the rocker member 20 and the free ends of the extensions 34 of the rocker levers 30 respectively. A saw blade 38 has two ends pivotally secured between the free ends of the legs 33 of the rocker levers 30 with pivot joints or pivot couplers 70.

Figure 4:
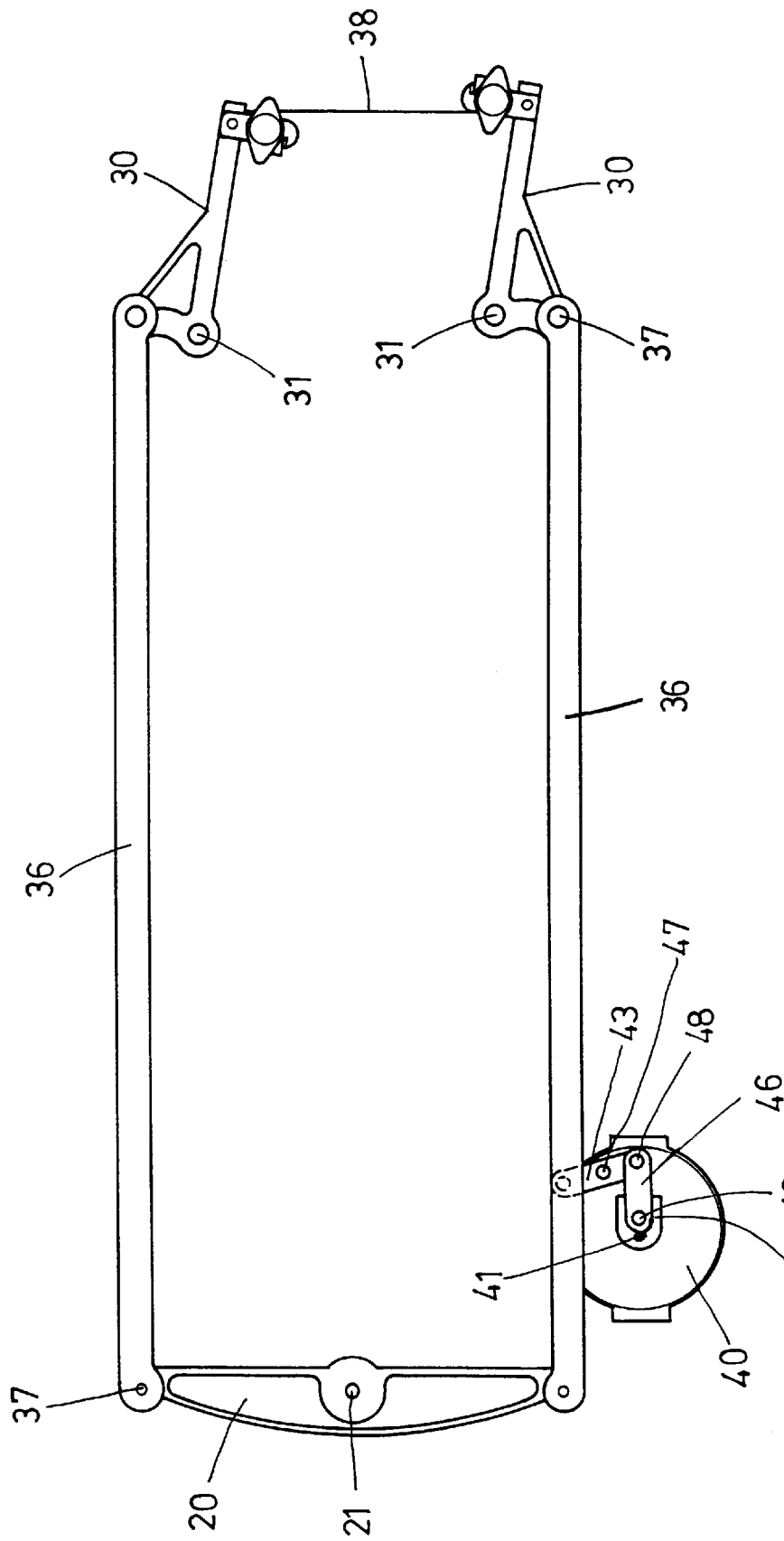
Figure 5:
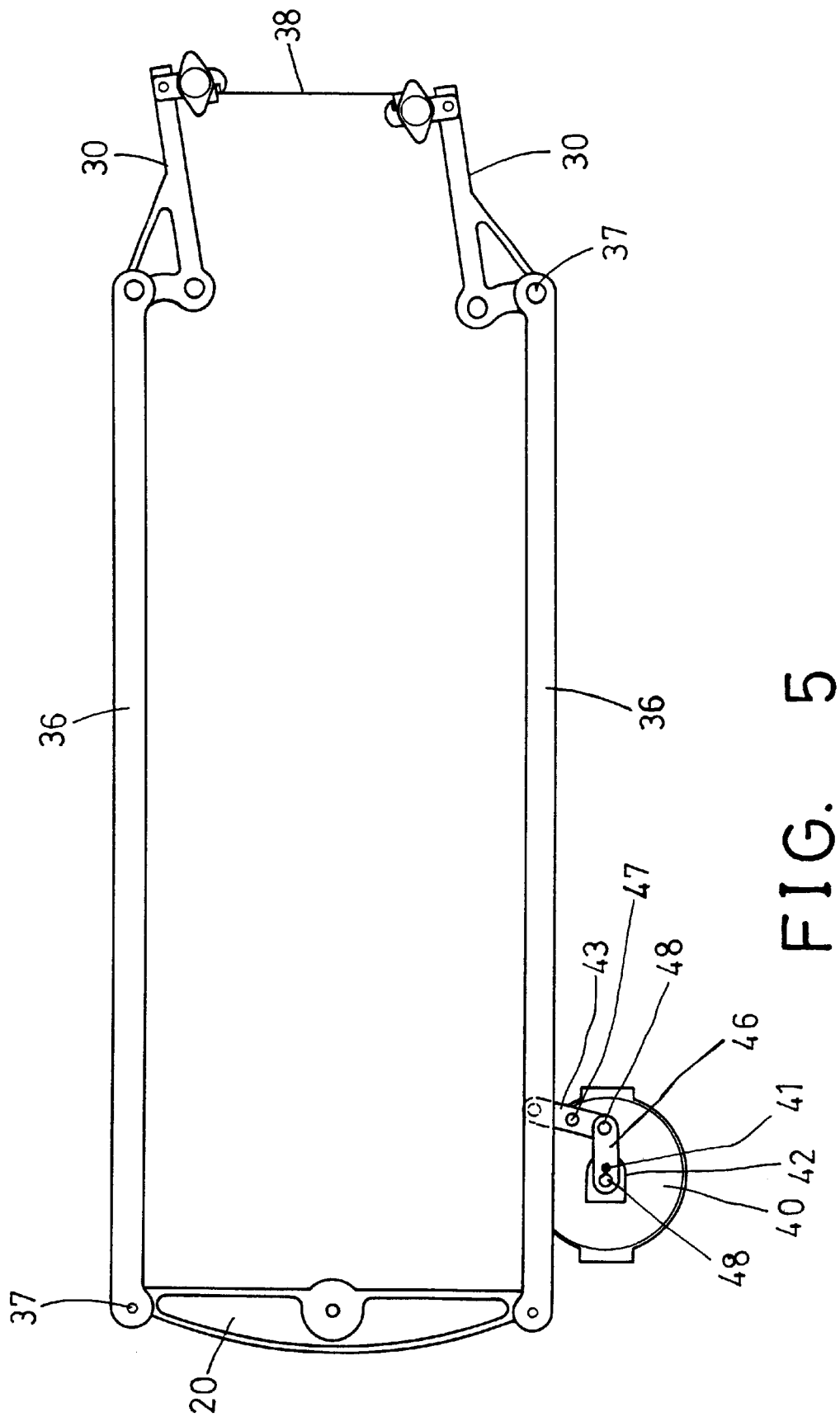

As shown in FIGS. 3–5, when the rocker member 20 is rotated in a reciprocating action about its pivot shaft 21 or is oscillated to rotate about its pivot shaft 21, the links 36 may be caused and forced to move or to slide in the base 11 and in the cantilever arm 14 back and forth in a reciprocating action. The rocker levers 30 may thus be caused to rotate or to pivot about the respective pivot axles 31, such that the saw blade 38 may be forced to move up and down in a reciprocating action.

A motor 40 is secured in the base 11 or in the casing 12, and includes a spindle 41 extended therefrom. A cam or a follower 42 is secured to the spindle 41 and rotated in concert with the spindle 41. A beam 43 has one end pivotally secured to the link 36, particularly the middle or one end portion of the like 26 with a pivot pin 44, and includes one or more orifices 47 formed in the middle portion thereof. A bar 46 has one end pivotally secured to the free end of the beam 43 with a pivot rod 48 and has the other end pivotally secured to the follower 42 with a pivot rod 48 which is separated or distal to the spindle 41, such that the bar 46 and the beam 43 and thus the links 36 and the rocker member 20 and the rocker levers 30 and the saw blade 38 may be forced to move in the reciprocating action.

One of the ends of the bar 46 may be secured to either of the orifices 47 of the beam 43 for adjusting the moving stroke of the beam 43 and the links 36 and the saw blade 38.

In operation, as shown in FIGS. 3–5, the spindle 41 and the follower 42 may be driven and rotated by the motor 40. The bar 46 and the beam 43 and thus the links 36 may be vibrated or oscillated or moved in the reciprocating action by the motor 40. The saw blade may thus be forced to move up and down in the reciprocating action by the motor 40 via the bar 46 and the beam 43 and the links 36 and the rocker member 20 and the rocker levers 30. It is to be noted that the saw blade may be effectively and dexterously actuated by the motor 40 via the elements. In addition, the bar 46 may be adjusted relative to the beam 43 for adjusting the moving strokes of the beam 43 and the links 36 and the rocker member 20 and the rocker levers 30 and thus the saw blade 38.

Accordingly, the scroll saw in accordance with the present invention includes an actuating mechanism for effectively and for dexterously actuating and operating the saw blade to conduct the sawing operations.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A scroll saw comprising:
   a) a housing;
   b) a rocker member including a middle portion pivotally secured in said housing with a pivot shaft, and including two ends;
   c) a first and a second rocker levers each pivotally secured in said housing with a pivot axle, said first rocker lever being disposed above said second rocker lever, said first and said second rocker levers each including a leg laterally extended outward therefrom and having a free end and each including an extension extended therefrom and having a free end,
   d) a saw blade including two ends pivotally secured between said free ends of said legs of said first and said second rocker levers, for moving up and down in a reciprocating action with said free ends of said legs of said first and said second rocker levers;
   e) a first and a second links pivotally secured between said ends of said rocker member and said free ends of said extensions of said first and said second rocker levers respectively for forcing said first and said second rocker levers to rotate about said pivot axles respectively when said rocker member is rotated about said pivot shaft; and
   f) oscillating means for oscillating said saw blade to move in a reciprocating action via said rocker member and said first and said second rocker levers and said first and said second links, said oscillating means including:
      i) a beam having a first end pivotally secured to said first link,
      ii) a motor including a spindle,
      iii) a follower secured to said spindle and rotated in concert with said spindle, and
      iv) a bar coupled between said follower and said beam for coupling said motor to said beam and to oscillate said beam and said first and said second links.

2. The scroll saw according to claim 1, wherein said beam includes at least one orifice formed therein, said oscillating means includes a pivot rod engaged through said at least one orifice of said beam and engaged through said bar for pivotally and adjustably coupling said bar to said beam and for adjusting a moving stroke of said links and said saw blade.

* * * * *